United States Patent
Yu et al.

(10) Patent No.: US 10,464,594 B2
(45) Date of Patent: Nov. 5, 2019

(54) MODEL BASED DRIVER TORQUE ESTIMATION

(71) Applicant: Steering Solutions IP Holding Corporation, Saginaw, MI (US)

(72) Inventors: Bo Yu, Troy, MI (US); Anthony J. Champagne, Saginaw, MI (US); Tejas M. Varunjikar, Saginaw, MI (US); Timothy W. Kaufmann, Frankenmuth, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 138 days.

(21) Appl. No.: 14/933,461

(22) Filed: Nov. 5, 2015

(65) Prior Publication Data

US 2017/0066473 A1    Mar. 9, 2017

Related U.S. Application Data

(60) Provisional application No. 62/213,919, filed on Sep. 3, 2015.

(51) Int. Cl.
    *B62D 15/02*    (2006.01)
    *B62D 6/10*     (2006.01)
    *B62D 5/04*     (2006.01)

(52) U.S. Cl.
    CPC ......... *B62D 5/0463* (2013.01); *B62D 5/0466* (2013.01); *B62D 6/10* (2013.01); *B62D 15/025* (2013.01)

(58) Field of Classification Search
    CPC combination set(s) only.
    See application file for complete search history.

(56) References Cited

U.S. PATENT DOCUMENTS

| 4,660,671 A | 4/1987 | Behr et al. |
| 4,800,974 A | 1/1989 | Wand et al. |

(Continued)

FOREIGN PATENT DOCUMENTS

| CN | 1442336 A | 9/2003 |
| CN | 1651293 A | 8/2005 |

(Continued)

OTHER PUBLICATIONS

Lee, D., & Yi, K. Disturbance adaptive steering wheel torque control for enhanced path tracking of autonomous vehicles. (May 2017). In American Control Conference (ACC), 2017 (pp. 2321-2326). IEEE.*

(Continued)

*Primary Examiner* — Thomas G Black
*Assistant Examiner* — Ana D Thomas

(57) ABSTRACT

A control system for a power steering system includes an error module that generates an error signal based on a difference of an estimated output vector and an output vector, a scaling module that calculates a feedback correction signal based on the error signal and an observer gain value, an extended state vector estimation module that determines an extended state vector estimate based on the feedback correction signal and a motor torque command, and a gain module that applies a gain to the extended state vector estimate to generate an estimated driver torque signal, the estimated driver torque signal is applied in control of the power steering system.

17 Claims, 8 Drawing Sheets

(56) References Cited

U.S. PATENT DOCUMENTS

| | | | |
|---|---|---|---|
| 4,874,053 A | 10/1989 | Kimura et al. | |
| 5,029,466 A | 7/1991 | Nishihara et al. | |
| 5,473,539 A | 12/1995 | Shimizu et al. | |
| 5,482,129 A | 1/1996 | Shimizu | |
| 5,677,809 A * | 10/1997 | Kadlec | G11B 5/5534 360/77.07 |
| 5,709,281 A | 1/1998 | Sherwin et al. | |
| 5,919,241 A | 7/1999 | Bolourchi et al. | |
| 5,927,421 A | 7/1999 | Fukada | |
| 5,948,030 A | 9/1999 | Miller et al. | |
| 5,992,557 A | 11/1999 | Nakamura et al. | |
| 6,032,091 A | 2/2000 | Noro et al. | |
| 6,046,560 A * | 4/2000 | Lu | B62D 5/0463 180/443 |
| 6,152,254 A | 11/2000 | Phillips | |
| 6,223,852 B1 | 5/2001 | Mukai et al. | |
| 6,250,419 B1 | 6/2001 | Chabaan et al. | |
| 6,298,941 B1 | 10/2001 | Spadafora | |
| 6,370,459 B1 | 4/2002 | Phillips | |
| 6,425,454 B1 | 7/2002 | Chabaan et al. | |
| 6,588,541 B2 | 7/2003 | Norman et al. | |
| 6,687,590 B2 | 2/2004 | Kifuku et al. | |
| 6,690,137 B2 * | 2/2004 | Iwaji | H02P 6/18 318/430 |
| 6,711,483 B2 * | 3/2004 | Kimura | B62D 5/0457 180/412 |
| 6,742,620 B2 | 6/2004 | Eidam et al. | |
| 6,799,656 B2 | 10/2004 | Kimura et al. | |
| 6,959,970 B2 | 11/2005 | Tseng | |
| 6,979,967 B2 * | 12/2005 | Ho | H02P 21/26 318/400.02 |
| 7,040,450 B2 | 5/2006 | Nagase et al. | |
| 7,558,661 B2 | 7/2009 | Sundaram et al. | |
| 7,596,441 B2 | 9/2009 | Yokota et al. | |
| 7,613,258 B2 * | 11/2009 | Yu | H04B 1/7097 342/357.68 |
| 7,791,296 B2 * | 9/2010 | Ogawa | B62D 5/04 318/434 |
| 7,885,750 B2 | 2/2011 | Lu | |
| 7,954,593 B2 | 6/2011 | Dornhege et al. | |
| 7,974,754 B2 | 7/2011 | Nakatsu | |
| 7,975,801 B2 | 7/2011 | Tashiro | |
| 8,010,252 B2 | 8/2011 | Getman et al. | |
| 8,108,105 B2 | 1/2012 | Saruwatari et al. | |
| 8,165,770 B2 | 4/2012 | Getman et al. | |
| 8,170,751 B2 | 5/2012 | Lee et al. | |
| 8,175,771 B2 | 5/2012 | Ukai et al. | |
| 8,219,283 B2 | 7/2012 | Recker et al. | |
| 8,548,667 B2 | 10/2013 | Kaufmann et al. | |
| 8,571,759 B2 | 10/2013 | Oblizajek et al. | |
| 8,594,892 B2 | 11/2013 | Fujimoto et al. | |
| 8,666,605 B2 | 3/2014 | Delarche et al. | |
| 8,666,607 B2 | 3/2014 | Kojo | |
| 8,798,864 B2 | 8/2014 | Champagne et al. | |
| 8,825,301 B2 | 9/2014 | Sugawara et al. | |
| 8,843,276 B2 | 9/2014 | Kojo et al. | |
| 8,903,606 B2 | 12/2014 | Kleinau et al. | |
| 8,977,433 B2 | 3/2015 | Kojima | |
| 8,977,436 B2 | 3/2015 | Endo et al. | |
| 8,977,437 B2 | 3/2015 | Tamaizumi et al. | |
| 9,008,910 B2 * | 4/2015 | Cottard | B62D 5/0472 701/41 |
| 9,067,601 B2 * | 6/2015 | Itabashi | B60W 10/06 |
| 9,327,761 B2 | 5/2016 | Tsubaki | |
| 9,387,875 B2 | 7/2016 | Shimizu et al. | |
| 9,409,595 B2 | 8/2016 | Varunjikar et al. | |
| 9,452,775 B2 | 9/2016 | Tamura et al. | |
| 9,540,040 B2 | 1/2017 | Varunjikar et al. | |
| 9,540,044 B2 | 1/2017 | Kaufmann et al. | |
| 9,545,945 B2 | 1/2017 | Akatsuka et al. | |
| 9,676,409 B2 * | 6/2017 | Champagne | B62D 5/0472 |
| 9,815,449 B2 * | 11/2017 | Inoue | B60W 10/184 |
| 9,903,299 B2 * | 2/2018 | Homant | F02D 41/3064 |
| 2002/0005316 A1 | 1/2002 | Tokumoto | |
| 2002/0026267 A1 | 2/2002 | Kifuku | |
| 2002/0092696 A1 | 7/2002 | Bohner et al. | |
| 2002/0177932 A1 | 11/2002 | Kifuku et al. | |
| 2002/0179362 A1 | 12/2002 | Norman et al. | |
| 2003/0030404 A1 * | 2/2003 | Iwaji | H02P 6/18 318/700 |
| 2003/0074120 A1 | 4/2003 | Kleinau | |
| 2003/0150366 A1 * | 8/2003 | Kaufmann | B63B 39/061 114/144 RE |
| 2004/0024505 A1 | 2/2004 | Salib et al. | |
| 2004/0055810 A1 | 3/2004 | Rakan | |
| 2004/0099469 A1 | 5/2004 | Koibuchi et al. | |
| 2004/0117088 A1 | 6/2004 | Dilger | |
| 2004/0262063 A1 | 12/2004 | Kaufmann et al. | |
| 2005/0189163 A1 | 9/2005 | Barton et al. | |
| 2005/0206224 A1 | 9/2005 | Lu | |
| 2005/0206229 A1 | 9/2005 | Lu et al. | |
| 2005/0246085 A1 | 11/2005 | Salib et al. | |
| 2005/0256620 A1 | 11/2005 | Kato | |
| 2006/0060412 A1 | 3/2006 | Bolourchi et al. | |
| 2006/0069481 A1 * | 3/2006 | Kubota | B62D 5/0463 701/41 |
| 2007/0299580 A1 | 12/2007 | Lin | |
| 2008/0147276 A1 | 6/2008 | Pattok et al. | |
| 2009/0024281 A1 | 1/2009 | Hwang | |
| 2009/0078494 A1 | 3/2009 | Dornhege et al. | |
| 2009/0105907 A1 | 4/2009 | Yamaguchi et al. | |
| 2009/0125186 A1 | 5/2009 | Recker et al. | |
| 2009/0143938 A1 | 6/2009 | Nishimura | |
| 2009/0216407 A1 | 8/2009 | Cottard et al. | |
| 2009/0240389 A1 | 9/2009 | Nomura et al. | |
| 2009/0271075 A1 | 10/2009 | Hales et al. | |
| 2009/0292421 A1 | 11/2009 | Williams et al. | |
| 2009/0294206 A1 | 12/2009 | Oblizajek et al. | |
| 2010/0100283 A1 | 4/2010 | Hales et al. | |
| 2010/0286869 A1 | 11/2010 | Katch et al. | |
| 2011/0010054 A1 | 1/2011 | Wilson-Jones et al. | |
| 2011/0022272 A1 | 1/2011 | Hung et al. | |
| 2011/0213527 A1 * | 9/2011 | Itabashi | B60W 10/06 701/37 |
| 2011/0218706 A1 | 9/2011 | Mori et al. | |
| 2011/0282552 A1 * | 11/2011 | Gebregergis | B62D 5/0418 701/42 |
| 2012/0041644 A1 | 2/2012 | Turner | |
| 2012/0199414 A1 | 8/2012 | Shimizu et al. | |
| 2012/0232754 A1 | 9/2012 | Champagne et al. | |
| 2012/0261209 A1 | 10/2012 | Shiino | |
| 2012/0312627 A1 | 12/2012 | Morishita et al. | |
| 2013/0024072 A1 | 1/2013 | Michelis et al. | |
| 2013/0030654 A1 | 1/2013 | Oblizajek et al. | |
| 2013/0073146 A1 | 3/2013 | Konomi et al. | |
| 2013/0124048 A1 | 5/2013 | Gruener et al. | |
| 2013/0131926 A1 | 5/2013 | Champagne et al. | |
| 2013/0151066 A1 | 6/2013 | Koukes et al. | |
| 2013/0201047 A1 * | 8/2013 | Tsai | H03M 1/1023 341/155 |
| 2013/0261894 A1 | 10/2013 | Kojima | |
| 2014/0005894 A1 | 1/2014 | Aoki | |
| 2014/0149000 A1 | 5/2014 | Tamura et al. | |
| 2014/0257641 A1 * | 9/2014 | Champagne | B62D 5/0472 701/42 |
| 2014/0303848 A1 | 10/2014 | Bean et al. | |
| 2014/0324294 A1 * | 10/2014 | Champagne | B62D 5/0463 701/41 |
| 2015/0012182 A1 * | 1/2015 | Flehmig | B62D 6/002 701/41 |
| 2015/0151783 A1 | 6/2015 | Kitazume | |
| 2015/0171667 A1 | 6/2015 | Kai et al. | |
| 2015/0191200 A1 | 7/2015 | Tsubaki et al. | |
| 2016/0001810 A1 | 1/2016 | Tsubaki | |
| 2016/0031481 A1 * | 2/2016 | Birsching | B62D 7/222 701/36 |
| 2016/0075371 A1 | 3/2016 | Varunjikar et al. | |
| 2016/0107679 A1 | 4/2016 | Kimura et al. | |
| 2016/0229446 A1 | 8/2016 | Tamaizumi et al. | |
| 2016/0288825 A1 | 10/2016 | Varunjikat et al. | |
| 2017/0066472 A1 * | 3/2017 | Wang | B62D 5/0463 |

(56) References Cited

U.S. PATENT DOCUMENTS

| | | | | |
|---|---|---|---|---|
| 2017/0158228 A1* | 6/2017 | She | | B62D 5/0463 |
| 2017/0232998 A1 | 8/2017 | Ramanujam et al. | | |
| 2017/0355396 A1 | 12/2017 | Varunjikar et al. | | |

FOREIGN PATENT DOCUMENTS

| | | | |
|---|---|---|---|
| CN | 1935576 A | 3/2007 | |
| CN | 100999223 A | 7/2007 | |
| CN | 101142548 A | 3/2008 | |
| CN | 101218146 A | 7/2008 | |
| CN | 101522504 A | 9/2009 | |
| CN | 101683867 A | 3/2010 | |
| CN | 101716951 A | 6/2010 | |
| CN | 101734277 A | 6/2010 | |
| CN | 102019957 A | 4/2011 | |
| CN | 102556065 A | 7/2012 | |
| CN | 102666256 A | 9/2012 | |
| CN | 102806942 A | 12/2012 | |
| CN | 102917939 A | 2/2013 | |
| CN | 103079934 | 5/2013 | |
| CN | 102556152 B | 7/2013 | |
| CN | 104044586 A | 9/2014 | |
| CN | 104334439 A | 2/2015 | |
| CN | 104755358 A | 7/2015 | |
| DE | 19634728 C1 | 4/1998 | |
| DE | 19824914 | 12/1999 | |
| DE | 19912169 A1 | 7/2000 | |
| DE | 10048579 A1 | 4/2002 | |
| DE | 10344279 A1 | 4/2004 | |
| DE | 102005004726 A1 | 8/2006 | |
| DE | 102008051552 A1 | 4/2009 | |
| DE | 102008036001 A1 | 2/2010 | |
| DE | 102013112901 A1 | 5/2015 | |
| EP | 0353995 A2 | 2/1990 | |
| EP | 1127775 A1 * | 8/2001 | B62D 5/0466 |
| EP | 1508495 A2 | 2/2005 | |
| EP | 1623907 A1 | 2/2006 | |
| EP | 1995150 A2 | 11/2008 | |
| EP | 2028080 A1 | 2/2009 | |
| EP | 1808359 B1 | 4/2009 | |
| EP | 2184218 A2 | 5/2010 | |
| EP | 2275323 A1 | 1/2011 | |
| EP | 2223838 B1 | 11/2011 | |
| EP | 2492168 A1 | 8/2012 | |
| EP | 2497698 A1 | 9/2012 | |
| GB | 2454788 A | 5/2009 | |
| JP | 2001106099 A | 4/2001 | |
| JP | 2003002222 A | 1/2003 | |
| JP | 3712876 B2 | 11/2005 | |
| JP | 2005313770 A | 11/2005 | |
| JP | 2006143151 A | 6/2006 | |
| JP | 3819261 B2 | 9/2006 | |
| JP | 2006248250 A | 9/2006 | |
| JP | 2007514602 A | 6/2007 | |
| JP | 2009006985 A | 1/2009 | |
| JP | 2009051292 A | 3/2009 | |
| JP | 2011051409 A | 3/2011 | |
| JP | 5231923 B2 | 7/2013 | |
| KR | 2006083578 A | 7/2006 | |
| WO | 2005097577 A1 | 10/2005 | |
| WO | 2011148240 A1 | 12/2011 | |
| WO | 2012014399 A1 | 2/2012 | |
| WO | 2012066704 A1 | 5/2012 | |
| WO | 2012176553 A1 | 12/2012 | |

OTHER PUBLICATIONS

Wilhelm, F., Tamura, T., Fuchs, R., & Müllhaupt, P. Friction compensation control for power steering. (2016). IEEE Transactions on Control Systems Technology, 24(4), 1354-1367.*
Ansgar Rehm, Vehicle Velocity Estimation by Dynamic Inversion of Wheel Force Generation; Control Conference (ECC), 2009 European Year: 2009; pp. 4798-4803.
China Patent Application No. 201210586416.7 3rd Office Action dated Feb. 15, 2016, 14 pages.
Chinese Office Action for related Chinese Application No. CN201410086920.X, dated May 23, 2016, 8 pages.
D.I. Katzourakis, et al.; "Steering Force Feedback for Human-Machine-Interface Automotive Experiments"; IEEE Transactions on Instrumentation and Measurement, vol. 60, No. 1, pp. 32-43, Jan. 2011.
English Translation of Chinese Office Action for related CN Application No. 20121058416.7; dated Dec. 3, 2014; 15 pages.
English Translation of CN Chinese Office Action for related Chinese Application No. CN201410086920.X, dated May 23, 2016, 17 pages.
English Translation of CN Office Action & Search Report for related CN Application No. 201410086920.X; dated Nov. 5, 2015; 10 pages.
English Translation of CN Office Action & Search Report for related CN Application No. 2014110331120.X; dated Nov. 30, 2015; 9 pages.
EP Search Report for related EP Application No. 14166178.5; dated Aug. 22, 2014; 7 pages.
Extended EP Search Report for related EP Application No. 12192967.3, dated Apr. 2, 2013; 8 pages.
Extended EP Search Report for related EP Application No. EP14192466.2; dated Apr. 9, 2015; 8 pages.
Extended EP Search report from related Application No. 15184544.3-1755: dated Mar. 14, 2016; 7 pages.
Extended European Search Report for related EP Application No. 14156987.1; dated Jan. 21, 2015; 8 pages.
Extended European Search Report for related EP Application No. 15173865.5; dated Nov. 23, 2015; 10 pages.
Gillespie, T.D.; "Fundamentals of Vehicle Dynamics"; Warrendale, PA; Society of Automotive Engineers; 1992; ISBN 1560911999, 9781560911999; pp. 205-206.
J.C.F. de Winter, et al.; "A Two-Dimensional Weighting Function for a Driver Assistance System"; IEEE Transactions on Systems, Man and Cybernetics B, Cybern., vol. 38, No. 1, pp. 189-198, Feb. 2008.
Katzourakis, D.I., et al.; "Road-Departure Prevention in an Emergency Obstacle Avoidance Situation"; IEEE Transactions on Systems, Man, and Cybernetics: Systems; vol. 44, Issue 5; vol. 44, No. 5, pp. 621-629.
Peroutka, et al., Design Considerations for Control of Traction Drive with Permanent Magnet Synchronous Machine; Power Electronics and MOtion Control Conference, 2008, EPE-PEMC 2008, 13th Year: 2008; pp. 1529-1534, DOI: 10.1109/EPEPEMC.2008.4635484.
Pornsarayouth, S., et al., Sensor Fusion of Delay and Non-delay Signal using Kalman Filter with Moving Covariance, Robotics and Biomimetics, 2008, ROBIO 2008, IEEE International Conference on: Year 2009; pp. 2045-2049, DOI: 10.1109/ROBIO.2009.4913316.
Van der Jagt, Pim; "Prediction of Steering Efforts During Stationary or Slow Rolling Parking Maneuvers"; Ford Forschungszentrum Aachen GmbH.; Oct. 27, 1999; 20 pages.
Wilhelm, et al., Friction Compensation Control for Power Steering, Control Systems Technology, IEEE Transactions on; Year: 2015, vol. PP, Issue: 99; pp. 1-14, DOI:10.1109/TCST.2015.2483561.
English Abstract of Li Yong et al., Control Technique of Vehicle Stability, Jan. 31, 2013, Mechanical Industry Press, 1 page.
Gillespie, Thomas D., Fundamentals of Vehicle Dynamics, 2000, pp. 201-208, Society of Automotive Engineers—Authorized Simplified Chinese translation edition by Scientific & Technical Publishing Co., 2006, pp. 138-142 (correspond to original pp. 201-208).
Gillespie, Thomas D., Fundamentals of Vehicle Dynamics, 2000, pp. 201-208, Society of Automotive Engineers.
Li Yong et al., Control Technique of Vehicle Stability, Jan. 31, 2013, pp. 137-138, Mechanical Industry Press.
German Office Action dated Mar. 5, 2018 cited in Application No. 10 2016 116 292.2, 10 pgs. (with English language translation).
German Office Action dated Mar. 5, 2018 cited in Application No. 10 2016 116 291.4, 10 pgs. (with English language translation).

(56) References Cited

OTHER PUBLICATIONS

CN Application No. 2014106438448 Second Office Action, dated Apr. 24, 2017, 9 pages.
CN Application No. 201510617600 Office Action dated Apr. 12, 2017, 8 pages.
CN Application No. 201510742251 First Office Action dated Apr. 26, 2017, 8 pages.
CN Patent Application No. 201210586416.7 4th Office Action dated Sep. 21, 2016, 8 pages.
CN Patent Application No. 201410086920 Third Office Action dated Aug. 14, 2017, 6 pages.
English Translation of Chinese Office Action for related CN Application No. 201410643844.8; dated Aug. 22, 2016; 26 pages.
Hsu, Yung-Hsiang Judy, "Estimation and Control of Lateral Tire Forces using Steering Torque"; Dissertaion of Stanford University, Mar. 2009; 191 pages.
OA dated Sep. 28, 2017.
Office Action dated Aug. 22, 2016.
Athira Vijayan et al., Precise Tuning for Power Steering, International Conference on Wireless Communications, Signal Processing and Networking (IEEE WiSPNET), 2017, pp. 2309-2313.
Dongpil Lee et al., Disturbance Adaptive Steering Wheel Torque Control for Enhanced Path Tracking of Autonomous Vehicles, American Control Conference (ACC), May 24-26, 2017, pp. 2321-2326, Seattle, WA USA.
English Translation of Chinese Office Action & Search Report for Chinese Application No. 201611113750.5 dated Apr. 25, 2018, 10 pgs.
English Translation of Chinese Office Action & Search Report for Chinese Application No. 201611113886.6 dated Apr. 27, 2018, 7 pgs.
Frederic Wilhelm et al., Friction Compensation Control for Power Steering, IEEE Transactions on Control Systems Technology, Jul. 2016, pp. 1354-1367, vol. 24, No. 4, IEEE Journals & Magazines.
Luis Daniel Sosa Ruiz et al., Design and Construction of a Passive Mechanism for Emulation of Load Forces in an Electric Power Steering System, Sep. 20-22, 2017, pp. 1-6, 2017 14th IEEE International Conference on Electrical Engineering, Computing Science and Automatic Control (CCE), Mexico City, Mexico.
Chinese Office Action and Search Report rom the Chinese Patent Office for CN Application No. 201710448209.8 dated Dec. 25, 2018, 7 pages.
Chinese Office Action from the Chinese Patent Office for CN Application No. 201710448435.6 dated Dec. 11, 2018, 8 pages.

* cited by examiner

MODEL BASED DRIVER TORQUE ESTIMATION

CROSS-REFERENCES TO RELATED APPLICATIONS

This patent application claims priority to U.S. Provisional Patent Application Ser. No. 62/213,919, filed Sep. 3, 2015 which is incorporated herein by reference in its entirety.

BACKGROUND OF THE INVENTION

The present invention relates to a control system for an electric power steering system, and more particularly to a control system for estimating a driver torque based on a model based estimation.

An electric power steering (EPS) system may employ a torque sensor located between a steering column and a rack and pinion assembly. The torque sensor can measure the torque applied at the pinion and also serve as an approximation of the input torque applied to the steering wheel by the vehicle operator (e.g. driver). The output of the torque sensor may be used in calculations to determine an amount of assist torque provided by the motor.

Although the torque sensor can approximate the driver torque during steady state operations, the torque sensor measurement typically deviates from the driver torque during dynamic transients or during large rack force disturbances, such as when a driver releases the steering wheel, or when a driver subjects the vehicle to driving on a bumpy road, for example. A driver torque sensor can be added on the steering wheel to allow for an accurate measurement at an increased cost.

Accordingly, it is desirable to accurately estimate a driver torque in electric power steering system.

SUMMARY OF THE INVENTION

In one embodiment, a control system for a power steering system comprises an error module that generates an error signal based on a difference of an estimated output vector and an output vector, a scaling module that calculates a feedback correction signal based on the error signal and an observer gain value, an extended state vector estimation module that determines an extended state vector estimate based on the feedback correction signal and a motor torque command, and a gain module that applies a gain to the extended state vector estimate to generate an estimated driver torque signal, the estimated driver torque signal is applied in control of the power steering system.

In another embodiment, a method for controlling a power steering system comprises generating an error signal based on a difference of an estimated output vector and an output vector, calculating a feedback correction signal based on the error signal and an observer gain value, determining an extended state vector estimate based on the feedback correction signal and a motor torque command; and applying a gain to the extended state vector estimate to generate an estimated driver torque signal, the estimated driver torque signal assists in control of the power steering system.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
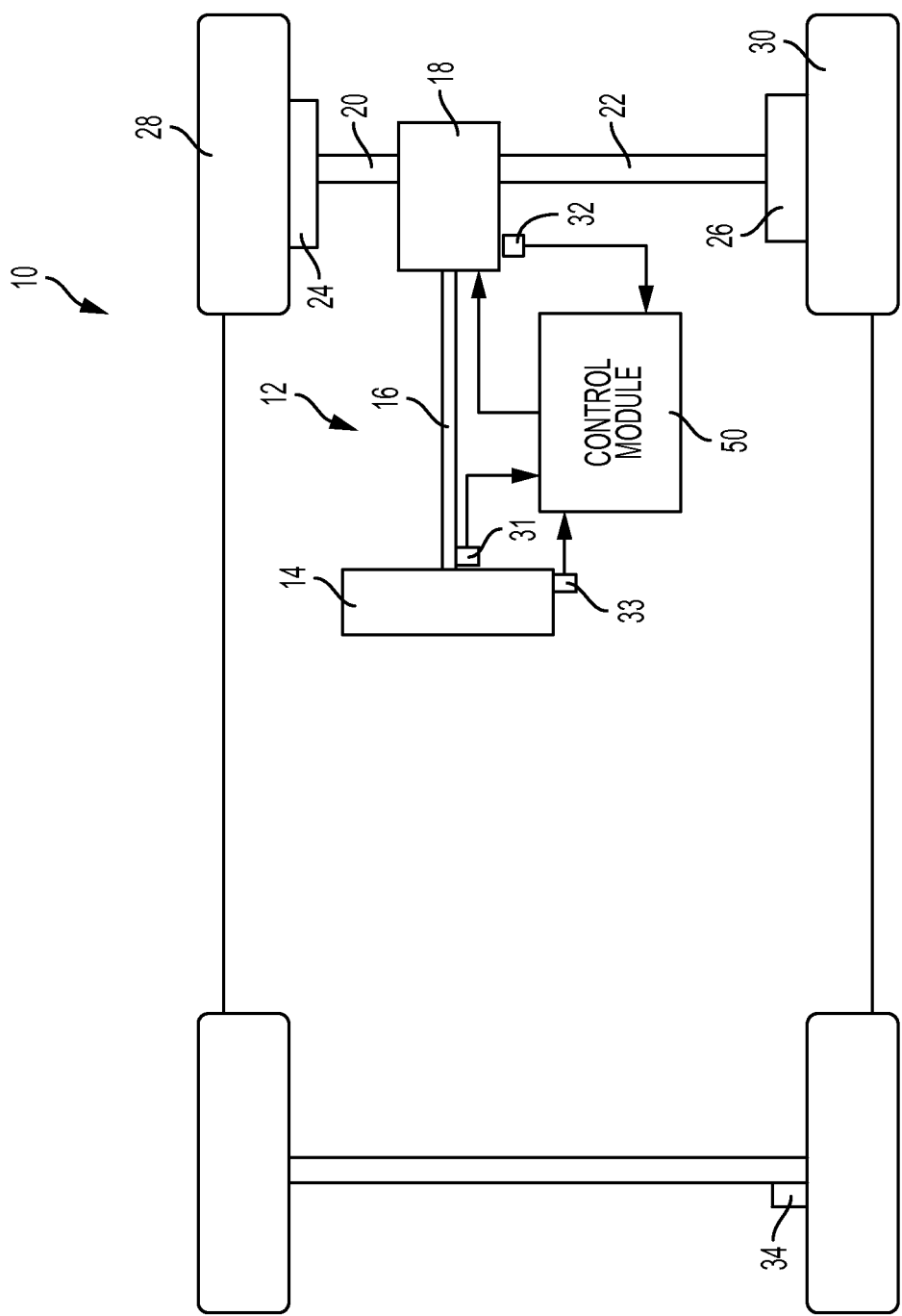
FIG. 1 illustrates a functional block diagram illustrating a vehicle including a steering system in accordance with one embodiment of the disclosure.

Referring now to the Figures, where the invention will be described with reference to specific embodiments, without limiting same, an exemplary embodiment of a vehicle 10 including a steering system 12 is illustrated. In various embodiments, the steering system 12 includes a handwheel 14 coupled to a steering shaft 16. In the exemplary embodiment shown, the steering system 12 is an electric power steering (EPS) system that further includes a steering assist unit 18 that couples to the steering shaft 16 of the steering system 12 and to a left tie rod 20 and a right tie rod 22 of the vehicle 10. It should be noted that the steering system 12 may be a rack assist EPS (REPS) as well. The steering assist unit 18 includes, for example, a rack and pinion steering mechanism (not shown) that may be coupled through the steering shaft 16 to a steering actuator motor and gearing. During operation, as the handwheel 14 is turned by a vehicle operator, the motor of the steering assist unit 18 provides the assistance to move the left tie rod 20 and the right tie rod 22 which in turn moves left and right steering knuckles 24, 26, respectively. The left knuckle 24 is coupled to a left roadway wheel 28, and the right knuckle 26 is coupled to a right roadway wheel 30 of the vehicle 10.

As shown in FIG. 1, the vehicle 10 further includes various sensors 31-34 that detect and measure signals of the steering system 12 and/or of the vehicle 10. The sensors generate sensor signals based on the measured signals. In one embodiment, a torque sensor 31 is provided for sensing a torque placed on the handwheel 14. In the exemplary embodiment as shown, the torque sensor 31 is placed on the hand wheel 14, however it is to be understood that the torque sensor 31 may not always be placed near or on the hand wheel 14. In one embodiment, the motor position/velocity sensor 32 senses motor position and/or velocity, and the handwheel position/velocity sensor 33 senses handwheel position and/or velocity. In addition, the vehicle 10 may include a wheel speed sensor 34 to assist in measuring vehicle speed. In the embodiment shown in FIG. 1, a single wheel speed sensor 34 is attached near a rear wheel of the vehicle 10. Although a single wheel speed sensor 34 is shown in FIG. 1, a plurality of wheel speed sensors may also be included. The wheel speed sensor 34 may be located on a transmission case and be driven by an output gear of a transmission of the vehicle 10.

A control module 50 controls the operation of the steering system 12 based on one or more of the sensor signals and further based on the steering control systems and methods of the present disclosure. In one embodiment, the control module 50 includes a driver torque estimation module 60. The driver torque estimation module 60 receives input signals that are measured signals of the EPS system. The driver torque estimation module 60 may estimate a driver torque based on the input signals received from a plurality of sensors, for example. The input signals can include but are not limited to a motor command, a t-bar torque signal as measured by the torque sensor 31 on the pinion or handwheel 14, a motor position signal and a motor velocity signal.

Figure 2:
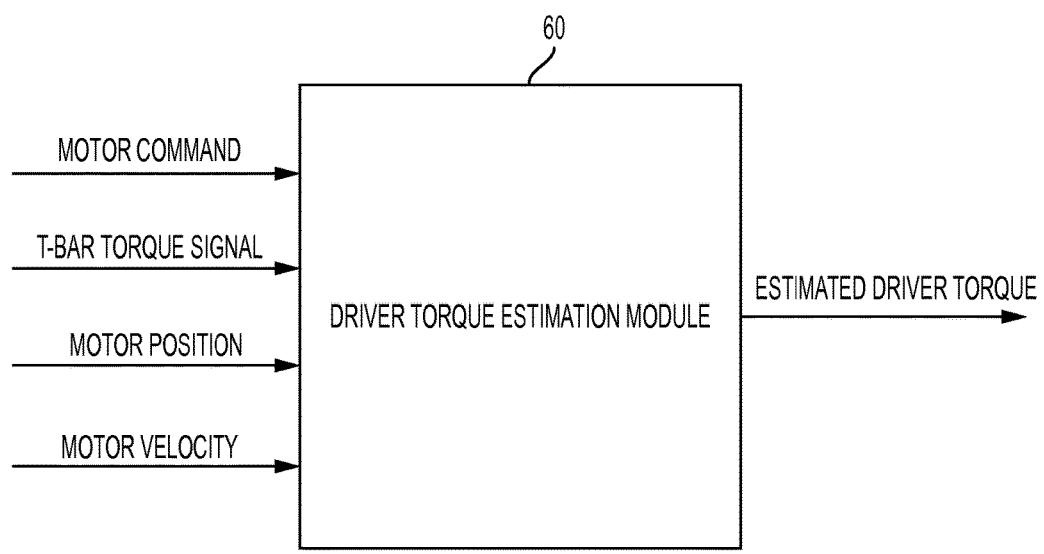
FIG. 2 illustrates a block diagram of a driver torque estimation module in accordance with one embodiment of the disclosure.

FIG. 2 illustrates an embodiment of a driver torque estimation module 60 of the control module 50 of FIG. 1. In various embodiments, the control module 50 can include one or more sub-modules and datastores. As used herein the terms module and sub-module refer to an application specific integrated circuit (ASIC), an electronic circuit, a processor (shared, dedicated, or group) and memory that executes one or more software or firmware programs, a combinational logic circuit, or other suitable components that provide the described functionality. As can be appreciated, the module shown in FIG. 2 may be further partitioned.

Inputs to the control module 50 may be generated from the torque sensor 31 (FIG. 1) of the vehicle 10 (FIG. 1) as well as the motor position/velocity sensor 32. In addition, the inputs may be received from other control modules (not shown) within the vehicle 10 (FIG. 1), and may be modeled or predefined. Alternatively, the control module 50 may receive handwheel position/velocity signals from the handwheel position/velocity sensor 33. The handwheel position/velocity signals are scaled to motor coordinates, instead of these signals being directly provided by motor position/velocity sensor 32.

In FIG. 2, the driver torque estimation module 60 receives a plurality of input signals. In some embodiments, the input signals include a motor command, a t-bar torque signal as measured by a torque sensor, for example, a motor position signal and a motor velocity signal. The torque sensor providing the t-bar torque signal may be located on the pinion or close to a steering column. In some embodiments, the t-bar torque signal is measured from a torsion bar on the handwheel. However, it is contemplated and understood that t-bar torque signal may be generated from any type of torque sensor.

The input signals are typically scaled in the handwheel coordinate, as some of the signals may have been originally provided in a motor coordinate by respective sensors. In some embodiments, the input signals are scaled into the handwheel coordinate by a mechanical ratio N and gear efficiency E. Alternatively or additionally, the input signals provided to the driver torque estimation module 60 can include a reference motor current signal, a measured motor current signal, a measured handwheel position, measured handwheel velocity, and a calculated motor torque, among other signals.

The measured input signals are used by the driver torque estimation module 60 to determine an estimated driver torque signal. The estimated driver torque signal can be used by the power steering system for further compensation of the handwheel and the EPS. In some embodiments, a three-mass mechanical model of the EPS system can be stored in the driver torque estimation module 60. The three-mass mechanical model can be used to represent system dynamics in the determination of the driver torque estimation. A three-mass EPS mechanical model is described in SAE 1999-01-0399, Badawy et al., Modeling and Analysis of an Electric Power Steering System, which is incorporated by reference herein. However, other mass models (e.g. one mass model, two mass model, ten mass model, etc.) may be used by the driver torque estimation module 60 in the estimation of the driver torque. The driver torque observer may use the mechanical model to determine the driver torque estimation based on the input signals. In some embodiments, the three mass model may take into account rack inertia, handwheel inertia, and motor inertia, among other factors. The mechanical model can be represented by a state space model based on the following state space equations:

$$\dot{x}(t) = Ax(t) + Bu(t) \quad \text{(Equation 1)}$$

$$y(t) = Cx(t) \quad \text{(Equation 2)}$$

In Equation 1, u(t) is an input vector as a function of motor torque, x(t) is an extended state vector as a function of handwheel position, handwheel velocity, motor position, motor velocity, rack position, rack velocity, driver torque. In Equation 2, y(t) is an output vector as a function of handwheel torque, motor position, and motor velocity. A, B, and C are matrices of the state space equations.

The driver torque estimation module 60 estimates non-measured states of the EPS system. In some embodiments, the driver torque estimation module 60 can use an extended state vector that includes an estimated driver torque state. The driver torque estimation module 60 is shown in more detail in FIG. 3.

Figure 3:
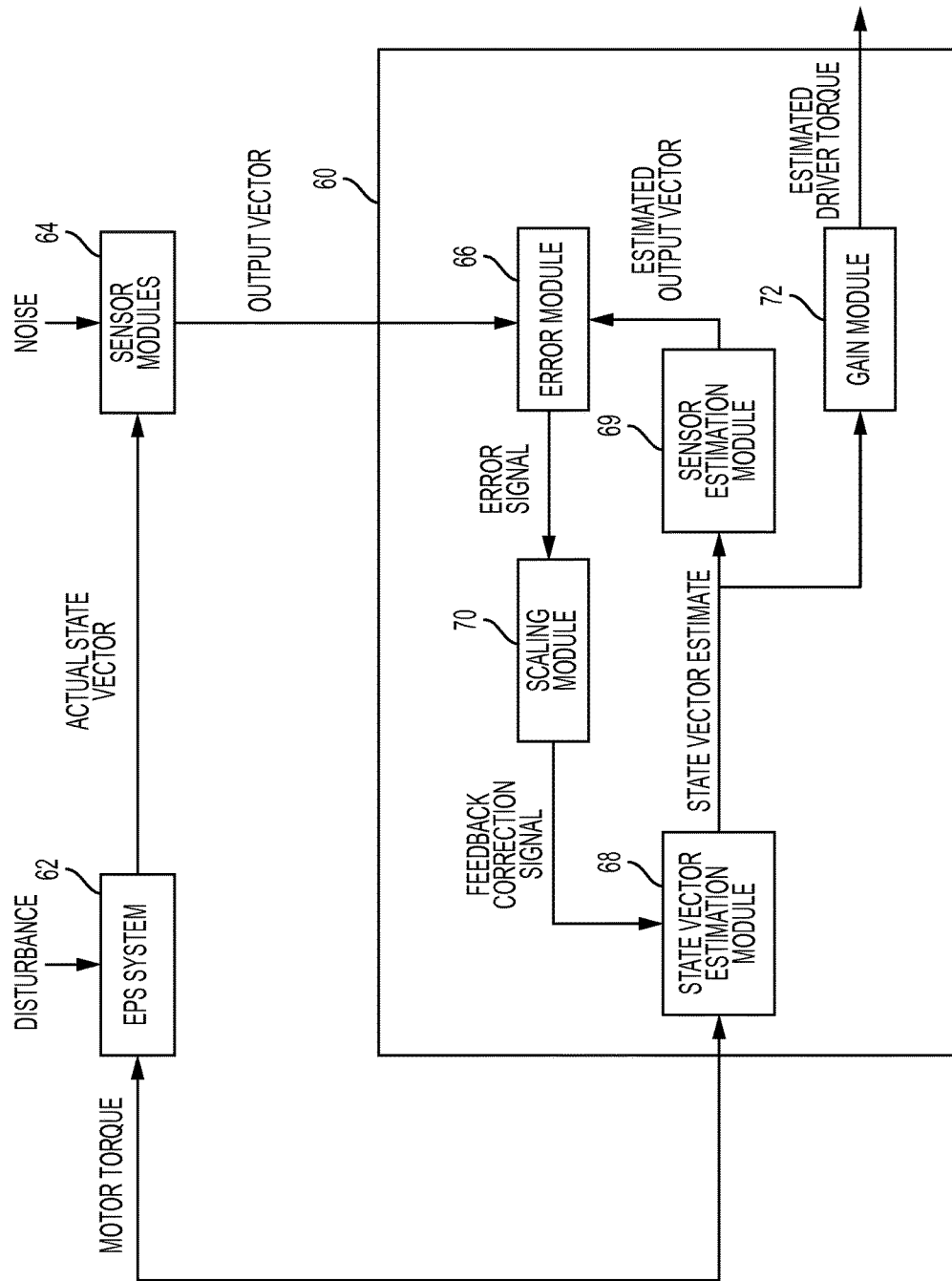
FIG. 3 illustrates a dataflow diagram of the driver torque estimation module in accordance with one embodiment of the disclosure.

FIG. 3 illustrates the driver torque estimation module 60 in accordance with one embodiment of the invention. The driver torque estimation module 60 analyzes the received input signals to calculate an estimated driver torque. The estimated driver torque may closely approximate an actual driver torque due to the algorithms employed by the driver torque estimation module 60.

In operation, a motor torque may be applied to an EPS system 62 by a permanent magnet synchronous motor. The EPS system 62 may be subject to a disturbance, including but not limited to, road jarring or a release of the handwheel by a driver during a steering operation. Accordingly, the actual driver torque acting on the EPS system may be affected by the disturbance.

The actual driver torque acting on the EPS system 62 may be measured by a sensor modules 64, which may include any number of sensors including the sensors shown in FIG. 1. The sensor modules 64 may analyze an actual state vector that includes the actual driver torque to determine a handwheel position, motor position and motor velocity of the EPS system. T-bar torque is also received and analyzed by the sensor modules 64. The driver torque estimation module 60 receives the handwheel position, t-bar torque, motor position and motor velocity from the sensor modules 64. In one embodiment, the sensor modules 64 output the received signals that can be represented as an output vector, but other representations are possible. As described in more detail below, the output vector is analyzed by an error module 66 of the driver torque estimation module 60.

The error module 66 receives the output vector and an estimated output vector as inputs. The error module 66 calculates an error signal that represents a difference between the output vector and the estimated output vector. The estimated output vector may represent selected estimated sensor signals, where the output vector may represent the actual signals provided by the sensor modules 64. The error signal is sent to the scaling module 70, which calculates a feedback correction signal.

In operation, the scaling module 70 scales the error signal to generate the feedback correction signal. In one embodiment, the feedback correction signal represents errors between measured and estimated values of handwheel torque, motor position, and motor velocity signals that have been scaled. To generate the feedback correction signal, the scaling module 70 multiplies the error signal by an observer gain value. The observer gain value may be a matrix designed at least in part using steady-state Kalman filtering or pole-placement method, as described by Gene F. Franklin, J. David Powell, and Abbas Etnami-Naeini, "Feedback control of dynamics systems." Pretince Hall Inc (2006); Gene F. Franklin, S. David Powell, and Michael L. Workman. *Digital control of dynamic systems*. Vol. 3. Menlo Park: Addison-Wesley, 1998, both of which are incorporated by reference herein.

The feedback correction signal generated by the scaling module 70 reduces the difference of the estimated output vector and the output vector by driving the error signal to approach zero.

In part, by allowing the feedback correction signal to approximate a zero error signal (e.g. zero value), the driver torque estimation module 60 estimates a driver torque that tracks the actual driver torque. The estimation of the driver torque is determined without an additional sensor specifically to measure the driver torque.

The feedback correction signal is sent to the extended state vector estimation module 68. The extended state vector estimation module 68 generates an extended state vector estimate.

In addition to receiving the output vector from the sensor modules 64, the driver torque estimation module 60 receives the motor torque command. In some embodiments, the motor torque command may be received by the state vector estimation module 68 of the driver torque estimation module 60.

The extended state vector estimation module 68 applies the motor torque command to a set of extended state space equations, which in one embodiment can include the equations described in equations 1 and 2. The extended state vector estimation module 68 further applies a feedback correction signal estimated by the scaling module 70 to the extended state space equation, thereby generating the extended state vector estimate. The extended state vector estimate may be represented by $\hat{x}(t)$, which in some embodiments, is a function of handwheel position (x_hw), handwheel velocity ($\dot{x}$_hw), motor position ($\dot{x}$_mot), motor velocity ($\dot{x}$ mot), rack position (x_am), rack velocity ($\dot{x}$_am), and driver torque (T_dr).

$$\dot{\hat{x}}(t)=A\hat{x}(t)+Bu(t)+L(y-\hat{y})$$ (Equation 3)

The extended state vector estimate is sent to a sensor estimation module 69, which uses the extended state vector estimate to calculate the estimated output vector. In some embodiments, the sensor estimation module 69 selectively filters the extended state vector estimate. Thus, the signals of the estimated output vector may correspond to the signals of the output vector. In some embodiments, the sensor estimation module 69 applies a selection matrix to reduce the extended state vector estimate to the estimated output vector.

The extended state vector estimate acts to reduce a magnitude of the error signal. The extended state vector estimate approaches the actual state vector. In some embodiments, the extended state vector estimate is multiplied by a fixed gain value by a gain module 72, to generate an estimated driver torque.

As noted above, the estimated output vector may represent an estimated t-bar torque, an estimated motor position, and an estimated motor velocity. However, it is further contemplated and understood that the error module may receive an estimated output vector and an output vector that include other EPS signals.

Figure 4:
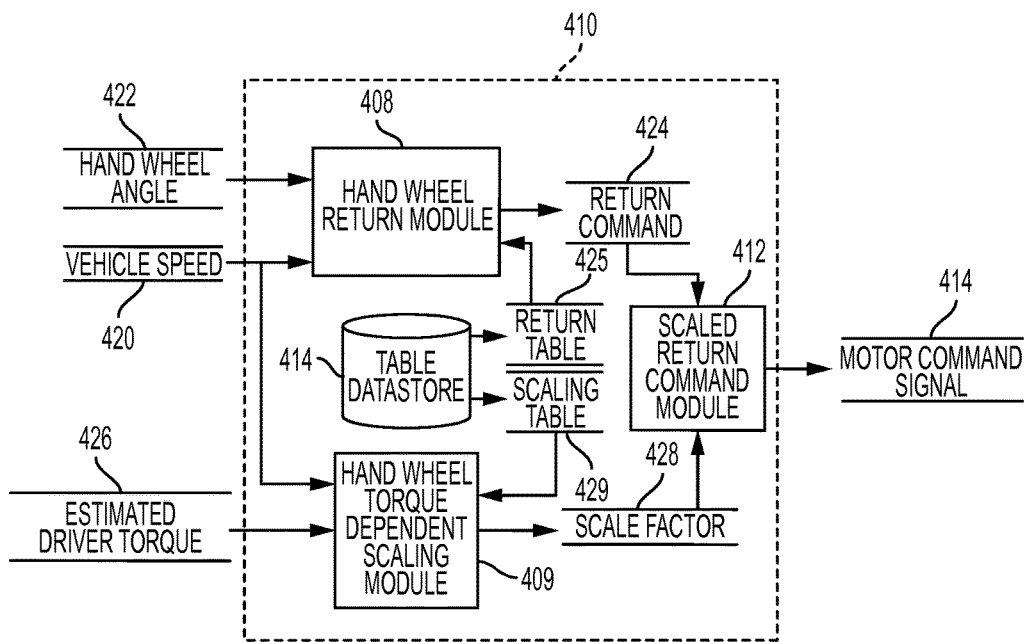
FIG. 4 illustrates a dataflow diagram of an estimated driver torque applied to a steering controller in a lane centering operation in accordance with one embodiment of the disclosure.

Referring to FIG. 4, the estimated driver torque produced by the driver torque estimation module 60 may be used to replace the handwheel torque as an input to the controller 410. The replacement of the handwheel torque with the estimated driver torque can produce faster return performance. Specifically, a hand wheel torque dependent scaling module 409 of the controller 410 may receive an estimated driver torque signal 426 instead of a torque signal from torsion bar sensor. Accordingly, an additional torque is not needed to acquire the torque data required by the hand wheel torque dependent scaling module 410.

In particular, inputs to the controller 410 of the control module 50 (FIG. 1) can be generated from the sensors 30-34 (FIG. 1) of the vehicle, can be modeled, and/or can be predefined. In this example, the controller 410 includes a hand wheel return module 408, a hand wheel torque dependent scaling module 409, a scaled return command module 412, and a table datastore 414, as shown in FIG. 4.

The hand wheel return module 408 receives as input vehicle speed 420 and hand wheel angle 422. The hand wheel angle 422 may be, for example, an angular position of the hand wheel relative to the center position of the hand wheel 404. The hand wheel return module 408 determines a return command 424 based on the vehicle speed 420 and the hand wheel angle 422. In various embodiments, the hand wheel return module 208 determines the return command 424 using one or more hand wheel return lookup tables 425. The lookup tables 425 can be indexed by the vehicle speed 420 and/or the hand wheel angle 422. The lookup tables 425 can be stored in and accessed from the table datastore 414.

In one example, the hand wheel return module 408 is associated with nine return tables 425. A vehicle speed 420 is defined for each of the nine return tables. A return curve is defined by the data points in the nine return tables. For example, each of the nine return curves is composed of sixteen data points. The data points are defined by the axis, where the axis is defined by hand wheel angle 422. In one example, the hand wheel angle 422 can range from zero to nine-hundred degrees. In various embodiments, the axis can be selectable. In various embodiments, all return curves share a common axis. As can be appreciated, the data of the return curves can be increasing or decreasing. The speed defined for curve zero can be used as a return speed breakpoint (e.g., return command is ramped to zero below the breakpoint speed).

Figure 5:
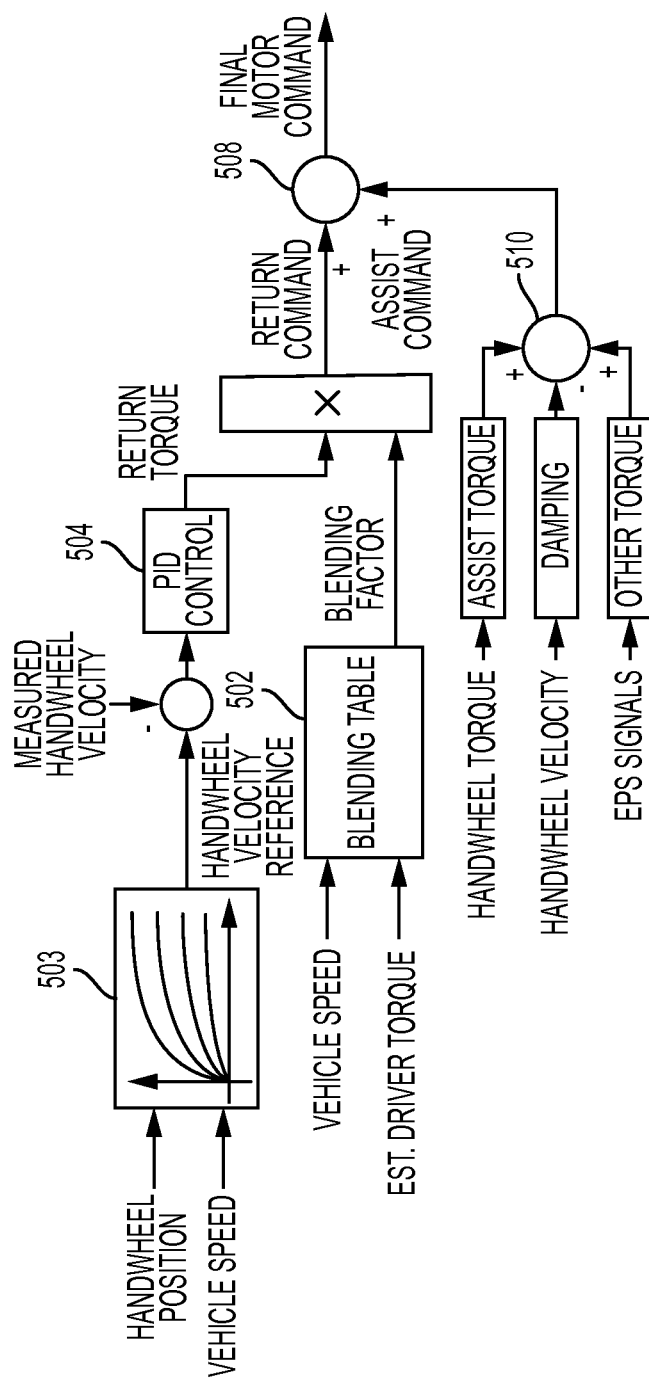
FIG. 5 illustrates a dataflow diagram of the estimated driver torque in a controlled velocity function in accordance with one embodiment of the disclosure.

As shown in FIG. 5, the estimated driver torque calculated by the driver torque estimation module 60 (FIG. 2) can be transmitted to a blending table 502. FIG. 5 illustrates the controlled velocity return function of the disclosure in more detail. In addition, the driver torque estimation module 60 can be included in the blending table to assist in the creation of a blending factor. The blending table 502 creates a blending factor based on the vehicle speed and estimated driver torque.

The blending strategy described in FIG. 5 further includes a handwheel velocity lookup table 503 that creates a handwheel velocity reference signal as a function of the handwheel position and vehicle speed. The handwheel velocity reference signal is compared with the measured handwheel velocity and output to a PID control 504. The PID control 504 evaluates the output, and generates a return torque. The return torque is multiplied by the blending factor at multiplier 506 to generate a return command. The return command is added to an assist command at adder 508, which is a function of assist torque, a damping value, and any other EPS signals summed at summation block 510. A final motor command is generated by combining the assist command with the return command. As shown, the system described in FIG. 5 is applicable to a controlled velocity return function, which requires a steering wheel to return to a center position at a pre-defined velocity when the driver's hands are not present on the steering wheel. The EPS determines that a driver's hands are no longer present on the wheel, and generates a motor torque to assist the return of the wheel to a center position. The absence of a driver's hands on the wheel is detected slower than desired when using t-bar torque. This is because of a time lag between the actual hands-off wheel event, and the decrease of the t-bar torque to a zero value. The t-bar torque is affected not only by driver torque but also handwheel inertia, damping, and other forces and assemblies in communication with the EPS. Following a hands off wheel event, driver torque typically decreases to a zero value more quickly than a t-bar torque. Thus, the driver torque can be used in one embodiment to responsively enable an assist torque. This allows a steering wheel to return to a center position after a minimal unassisted time interval. The implementation of the driver torque estimation module in a blending table to enable a smooth return of the handwheel to a center position.

Figure 6:
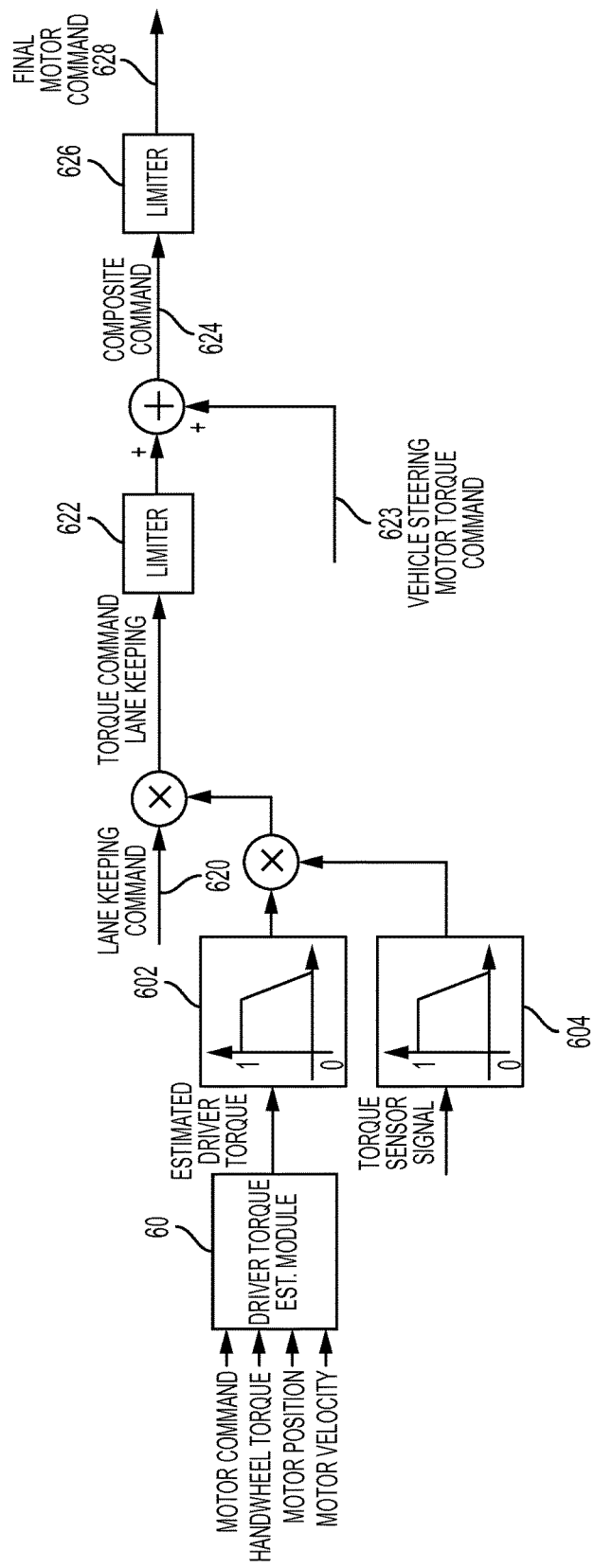
FIG. 6 illustrates a dataflow diagram of the driver torque estimation module implemented in an automated driver assistance system in accordance with one embodiment of the disclosure.

Referring now to FIG. 6, a dataflow diagram illustrates an embodiment of a submodule of the control module 50 (FIG. 1) used to control a steering system in an advanced driver assistance system. The driver torque estimation module 60 can also be implemented in a fully autonomous or other semi-autonomous vehicle system. The driver torque estimation module 60 generates an estimated driver torque signal, which is sent to blend lookup table 602. The blend lookup table 602 uses the estimated driver torque signal to produce a scalar blend value. This scalar blend value is multiplied with the torque scalar blend value produced by a torque scalar lookup table 604. A t-bar torque measured by torque sensor is used by table 604 to produce the torque scalar blend value. The scalar multiplier is multiplied with a lane keeping command 620 at junction 621 to generate a lane keeping torque command A limiter 622 clamps the magnitude of the lane keeping torque command. The lane keeping torque command is added to a vehicle steering motor torque command 623, to generate a composite motor command 624. A second limiter 626 clamps the composite motor command 626 to generate a final motor command 628.

Figure 7:
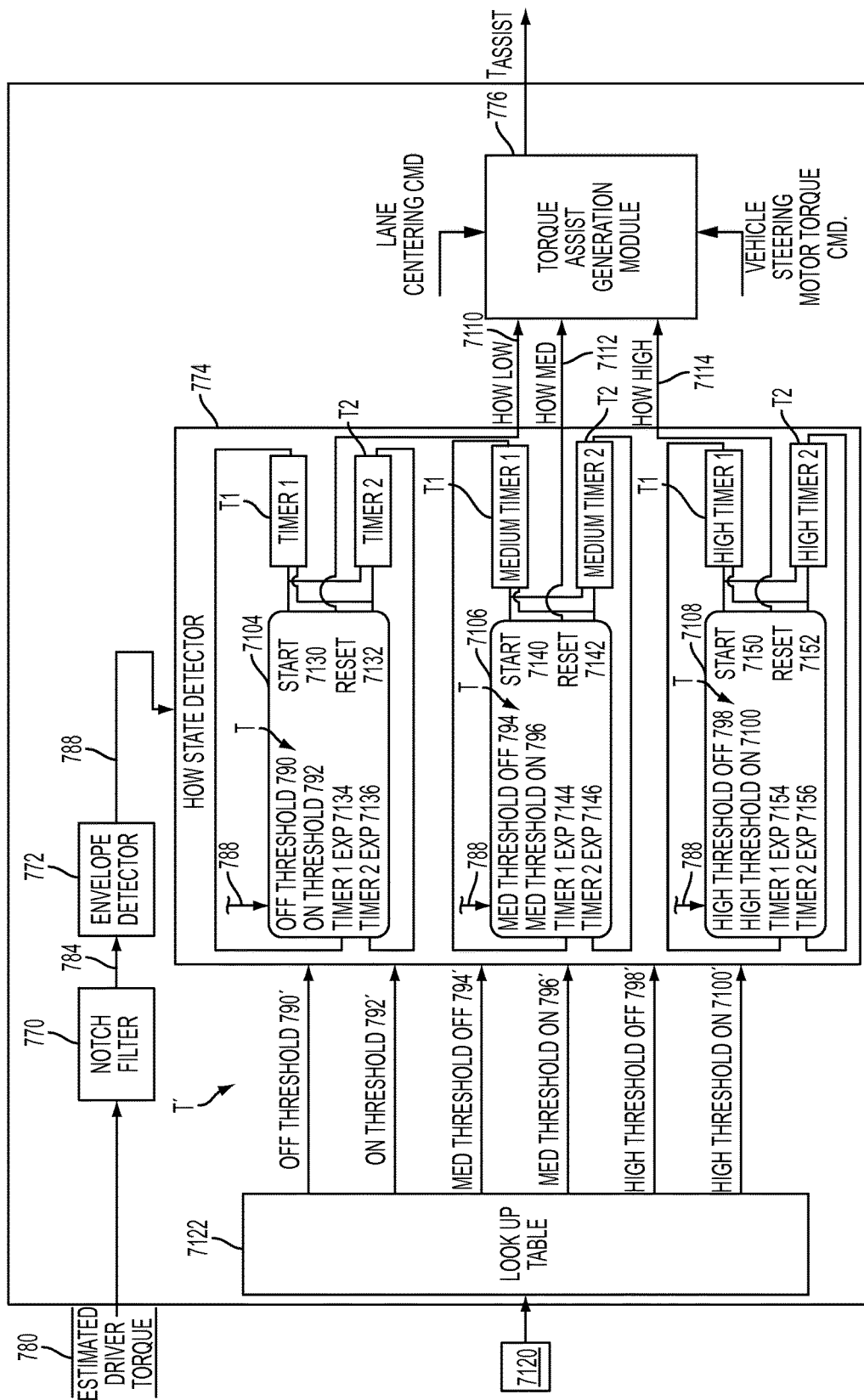
FIG. 7 illustrates a dataflow diagram of the driver torque estimation module in an automated driver assistance system in accordance with one embodiment of the disclosure.

Referring to FIG. 7, the estimated driver torque generated by the driver torque estimation module 60 can be applied to a hands on wheel detection module 702. In operation, the estimated driver torque 780 is filtered and processed by the hands on wheel detection module 702. The hands on wheel detection module 702 further analyzes the vehicle speed 706 sent from a vehicle speed sensor. A series of timer and threshold detectors are applied by the hands on wheel detection module 702 to generate a torque assist signal.

FIG. 7 is a block diagram of a hands off wheel calculation module 700 of the control module 50 (FIG. 1). The hands off wheel calculation module 700 illustrates one approach for determining a hands off wheel (HOW) condition. In the embodiment as shown, the hands off wheel calculation module 700 includes a notch filter 770 (also referred to as a band-stop filter), an envelope detector 772, a HOW state detector 774, and a torque assist generation module 776.

The hands off wheel calculation module 700 receives an estimated driver torque signal 780 from the driver estimation module 60 (FIG. 2) instead of a torque signal from a torque sensor located in a vicinity of a handwheel. Accordingly, a signal indicative of the amount of torque exerted on a hand wheel is not required by the hands off wheel calculation module 700. The notch filter 70 receives the estimated driver torque 780 as an input. The notch filter 770 may be any type of filtering device configured to remove or attenuate a band or range of frequencies in the estimated driver torque 780 that represent a normal column mode frequency, and produces as output a filtered estimated driver torque signal 784. The normal column mode frequency represents the vibrational modes that a hand wheel and a steering shaft operate within, if a driver has not placed his or her hands on the hand wheel (e.g., a hands off wheel condition). As will be further described herein, hands off wheel calculation module 700 contemplates that the hands off wheel condition exists if the HOW condition is not detected. For example, in one embodiment, the normal column mode frequency may range from about 8 Hertz to about 15 Hertz. The normal column mode may be adjusted based on the type of torque sensor that is provided (e.g., a compliant torque sensor versus a non-compliant torque sensor). The filtered estimated driver torque signal 784 is then sent to the envelope detector 772.

The envelope detector 772 determines an envelope of the filtered estimated driver torque signal 784, and produces a HOW detection signal 788 as output. The HOW detection signal 788 represents the envelope E of the filtered estimated driver torque signal 784 at a given point in time. The envelope detector 772 may use any number of envelope detection approaches to determine the HOW detection signal 788. For example, in software-based approach the envelope detector 772 passes the filtered estimated driver torque signal 784 to a low pass filter (not illustrated), and then determines an absolute value of the filtered estimated driver torque signal 784. The HOW detection signal 788 is then sent to the HOW state detector 774.

The HOW state detector 774 monitors the HOW detection signal 788 and determines if the HOW condition exists based on comparing the value of the HOW detection signal 788 with a threshold torque value over a predetermined time interval. If the HOW condition is determined to exist, then a HOW signal 710 is generated by the HOW state detector 774 and sent to the torque assist generation module 776. In one embodiment, the HOW state detector 776 may determine the level of force a driver may have on the hand wheel. For example, a HOW medium signal 712 indicates a relatively moderate level of force, and a HOW high signal 714 indicates a relatively high level of force. If the state detector 774 does not send either the HOW signal 710, the HOW medium signal 712, or the HOW high signal 714 to the torque assist generation module 776, then the hands off wheel condition exists. In the exemplary embodiment as shown in FIG. 7, the HOW state detector 774 includes an ON/OFF sub-module 704, a medium sub-module 706, and a high sub-module 708. The ON/OFF sub-module 704 is used to generate the HOW signal 710, the medium sub-module 706 is used to determine the HOW medium signal 712, and the high sub-module 708 is used to generate the HOW high signal 714. As the level of force estimated as being exerted by a driver increases (e.g., a relatively moderate level of force indicated by the HOW medium signal 712, or a relatively high level of force indicated by the HOW high signal 714), the driver estimation module 60 may predict with a higher confidence level that the HOW condition actually exists. For example, the HOW medium signal 712 indicates the HOW condition exists with relatively more certainty or confidence when compared to the HOW signal 710.

In the embodiment as shown in FIG. 7, six threshold torque values T are used by the HOW state detector 774, however it is to be understood that any other number of threshold torque values T may be used as well. The ON/OFF sub-module 7104 includes an OFF threshold value 790 and an ON threshold value 772. The OFF threshold value 90 indicates a driver does not have his or her hands on the hand wheel, and the ON threshold value 792 indicates a driver has his or her hands on the hand wheel. The medium sub-module 7106 includes a Medium Threshold OFF value 794 and a Medium Threshold ON value 796. The Medium Threshold OFF value 794 and the Medium Threshold ON value 796 are indicative of a moderate level of force by a driver on the hand wheel. The high sub-module 7108 includes a High Threshold OFF value 798 and a High Threshold ON value 100. The High Threshold OFF value 798 and the High Threshold ON value 7100 are indicative of a high level of force by a driver on the hand wheel. In one exemplary embodiment, the OFF threshold value 790 is about 0.175 Nm, the ON threshold value 7792 is about 0.7 Nm, the Medium Threshold OFF value 794 is about 0.8 Nm, the Medium Threshold ON value 7796 is about 1.0 Nm, the High Threshold OFF value 7798 is about 1.1 Nm, and the High Threshold ON value 7100 is about 1.5 Nm, however it is to be understood that other torque values may be used as well.

In one embodiment, the threshold torque values T may be adjusted based on the speed of the vehicle. The speed of the vehicle is monitored by the vehicle speed sensor. The driver estimation module 60 receives as input a vehicle speed signal 7120 from the vehicle speed sensor. The vehicle speed signal 7120 is sent to a lookup table 7122. The lookup table 7122 is used to determine modified torque threshold values T' based on the vehicle speed signal 7120. The modified torque threshold values T' are then sent to the HOW state detector 774. Specifically, the modified torque threshold values T' include an OFF threshold value 790', an ON threshold value 792', a Medium Threshold OFF value 794', a Medium Threshold ON value 796', a High Threshold OFF value 798', and a High Threshold ON value 7100'. The modified torque threshold values T' may be used in place of the torque threshold values T by the state detector 774.

A first timer T1 and a second timer T2 are provided for each of the ON/OFF sub-module 7104, the medium sub-module 7106, and the high sub-module 7108. Specifically, the ON/OFF sub-module 7104 is in communication with a first timer T1 and a second timer T2, the medium sub-module 7106 is in communication with a medium first timer T1 and a medium second timer T2, and the high sub-module 7108 is in communication with a high first timer T1 and a high second timer T2.

The ON/OFF sub-module 7104 of the HOW state detector 774 monitors the HOW detection signal 788 until the ON/OFF sub-module 7104 determines that the HOW detection signal 788 is greater than the ON threshold value 792. Upon determining the HOW detection signal 788 exceeds the ON threshold value 792, the ON/OFF sub-module 7104 sends a start timer signal 7130 to both the first timer T1 and the second timer T2. The first timer T1 is configured to count up from a first interval of time when receiving of the start timer signal 7130, and the second timer T2 is configured to count up from a second interval of time when receiving of the start timer signal 7130. The first interval of time and the second interval of time are calibratable values that maybe adjusted based on the type of application. In one embodiment, the first interval of time of the first timer T1 is less than the second interval of time of the second timer T2. The ON/OFF sub-module 7104 continues to monitor the HOW detection signal 788 as the first timer T1 counts up from the first interval of time. It should be noted that the first timer T1 and the second timer T2, the medium first timer T1, the medium second timer T2, the high first timer T1 and the high second timer T2 each run concurrently with one another.

The first timer T1 sends a Timer 1 expired signal 7134 to the ON/OFF sub-module 7104 once the first interval of time has expired. Once the Timer 1 expired signal 7134 is received by the ON/OFF sub-module 7104, then the ON/OFF sub-module 7104 determines if the HOW detection signal 788 has remained above the ON threshold value 792 during the first interval of time. If the HOW detection signal 788 has remained above the ON threshold value 792 during the first interval of time, then the HOW condition exists. The state detector 774 is set to a HOW=1 state (e.g., a HOW On state exists), and the ON/OFF sub-module 7104 generates the HOW signal 7110. The ON/OFF sub-module 7104 may also send a reset signal 7132 to the first timer T1 and the second timer T2. The reset signal 7132 initializes the first timer T1 back to time=0. The reset signal 7132 causes the second timer T2 to cease counting up, and initializes the second timer T2 back to time=0.

If the HOW detection signal 788 does not remain above the ON threshold value 792 during the first interval of time and the reset signal 7132 is not sent, the second timer T2 may continue to count up until the second interval of time has lapsed, and a Timer 2 expired signal 7136 is then sent to the ON/OFF sub-module 7104. Once the Timer 2 expired signal 7136 is received by the ON/OFF module 7104, then the ON/OFF sub-module 7104 determines if the HOW detection signal 788 has remained below the OFF threshold value 790 during the second interval of time. If the HOW detection signal 788 has remained below the OFF threshold value 790 during the second interval of time, then the HOW condition does not exist. The ON/OFF sub-module 7104 may then send the reset signal 7132 to initialize the first timer T1 and the second timer T2.

A similar approach may be used to generate the HOW medium signal 7112 by the medium sub-module 7106. The medium sub-module 7106 may monitor the HOW detection signal 788. Upon determining the HOW detection signal 788 is greater than the Medium threshold ON value 796, the medium sub-module 7106 sends a start timer signal 7140 to both the medium first timer T1 and the medium second timer T2. The medium sub-module 7106 continues to monitor the HOW detection signal 788 as the first timer T1 counts up from the first interval of time.

The medium first timer T1 sends a Timer 71 expired signal 7144 to the medium sub-module 7106 once the first interval of time has expired. Once the Timer 1 expired signal 7144 is received by the medium sub-module 7106, then the medium sub-module 7106 determines if the HOW detection signal 788 has remained above the Medium threshold ON value 796 during the first interval of time. If the HOW detection signal 788 has remained above the Medium threshold ON value 796 during the first interval of time, then the HOW condition exists. The state detector 774 is set to a HOW Medium state and generates the HOW Medium signal 7112. The medium sub-module 7106 may also send a reset signal 7142 to the medium first timer T1 and the medium second timer T2.

If the HOW detection signal 788 does not remain above the Medium threshold ON value 796 during the first interval of time and the reset signal 7142 is not sent, the medium second timer T2 may continue to count up until the second interval of time has lapsed, and a Timer 72 expired signal 7146 is then sent to the medium sub-module 7106. Once the Timer 2 expired signal 7146 is received by the medium sub-module 7106, then the medium sub-module 7106 determines if the HOW detection signal 788 has remained below the Medium threshold OFF value 796 during the second interval of time. If the HOW detection signal 788 has remained below the Medium threshold OFF value 794 during the second interval of time, then the HOW Medium condition does not exist. The medium sub-module 7106 may then send the reset signal 7142 to initialize the medium first timer T1 and the medium second timer T2.

A similar approach may be used to generate the HOW high signal 7114 by the high sub-module 7108. The high module 7108 monitors the HOW detection signal 788, and upon determining the HOW detection signal 788 is greater than the High threshold ON value 7100, the high sub-module 7108 sends a start timer signal 7150 to both the high first timer T1 and the high second timer T2. The high sub-module 7108 continues to monitor the HOW detection signal 788 as the high first timer T1 counts up from the first interval of time.

The high first timer T1 sends a Timer 1 expired signal 7154 to the high sub-module 7106 once the first interval of time has expired. Once the Timer 71 expired signal 7154 is received by the high sub-module 7108, then the high sub-module 7108 determines if the HOW detection signal 788 has remained above the High threshold ON value 7100 during the first interval of time. If the HOW detection signal 788 has remained above the High threshold ON value 7100 during the first interval of time, then the HOW High condition exists. The state detector 774 is set to a HOW High state and generates the HOW High signal 7114. The high sub-module 7108 may also send a reset signal 7152 to the high first timer T1 and the high second timer T2.

If the HOW detection signal 788 does not remain above the High threshold ON value 7100 during the first interval of time and the reset signal 7152 is not sent, the second timer T2 may continue to count up until the second interval of time has lapsed, and a Timer 72 expired signal 7156 is then sent to the high sub-module 7108. Once the Timer 2 expired signal 7156 is received by the high sub-module 7108, then the high sub-module 7108 determines if the HOW detection signal 788 has remained below the High threshold OFF value 798 during the second interval of time. If the HOW detection signal 788 has remained below the High threshold OFF value 798 during the second interval of time, then the HOW condition does not exist, and the state detector 774 is not set to the HOW High state. The high sub-module 7108 may then send the reset signal 7152 to initialize the high first timer T1 and the high second timer T2.

The torque assist generation module 776 receives as input the HOW signal 7110, the HOW Medium signal 7112, or the HOW high signal 7114 from the HOW state detector 774. The torque assist generation module 776 selectively generates the torque assist command Tassist to create torque nudges in the hand wheel 734 while a lane monitoring system is in assist mode. Specifically, the torque assist generation module 776 may only generate the torque assist command Tassist in assist mode if one of the HOW signal 7110, the HOW Medium signal 7112, or the HOW high signal 7114 is received from the HOW state detector 774. The torque assist generation module 776 may adjust the value of the torque assist command Tassist based on if the HOW signal 7110, the HOW Medium signal 7112, or the HOW high signal 7114 is received. Specifically, the torque assist command Tassist increases as the level of force exerted on the hand wheel 734 increases. For example, if the HOW high signal 7114 is received, then torque assist command Tassist generated may be greater than if the HOW signal 7110 was received. The HOW signal 7110, the HOW Medium signal 7112, or the HOW high signal 7114 from the HOW state detector 774 may also be provided to the lane monitoring system 732, where the lane monitoring system 732 may not switch from the assist mode to the autonomous mode unless the HOW condition exists (e.g., either the HOW signal 7110, the HOW Medium signal 7112, or the HOW high signal 7114 is sent by the state detector 774).

Figure 8:
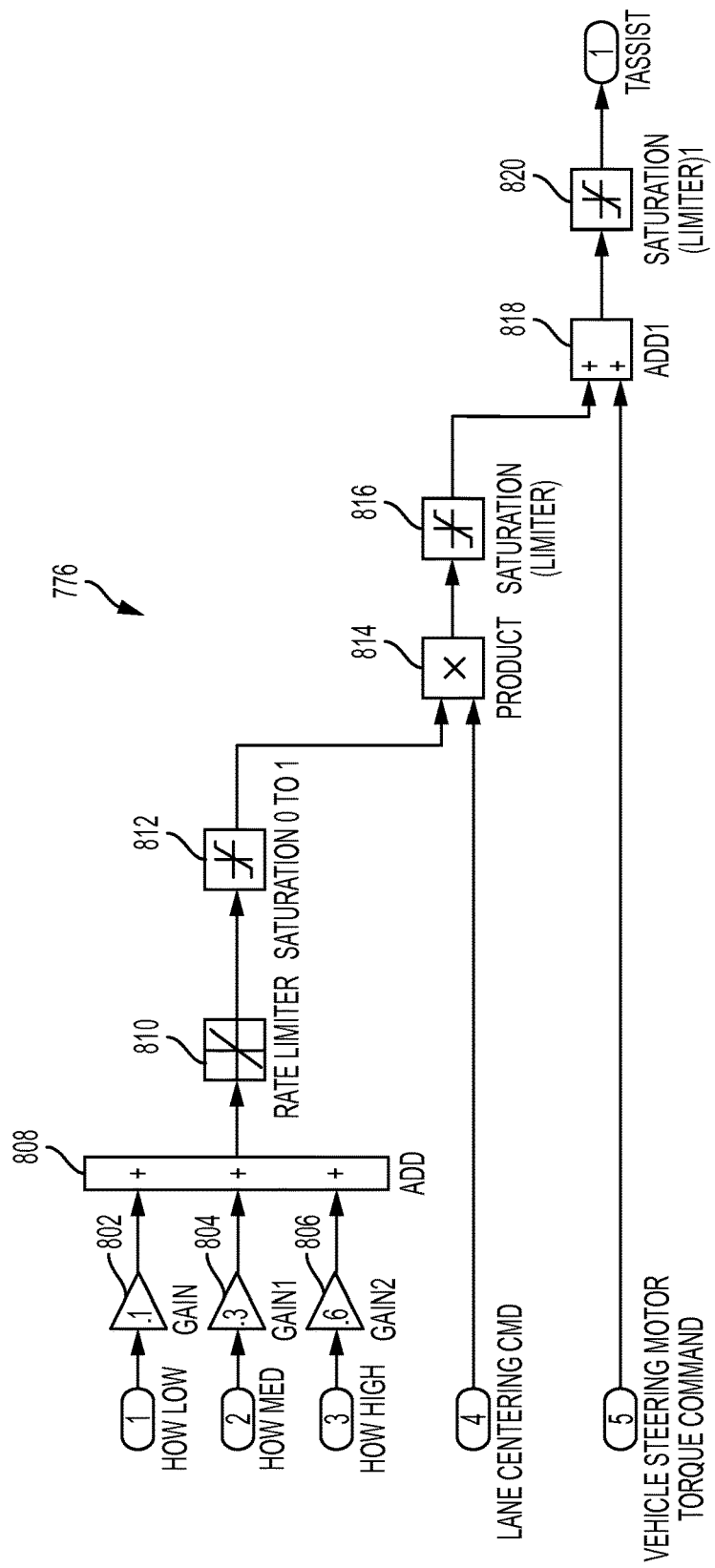
FIG. 8 illustrates a dataflow diagram of the torque assist generation module in accordance with one embodiment of the disclosure.

FIG. 8 illustrates a dataflow diagram of the torque assist generation module 776 in accordance with one embodiment of the disclosure.

In operation, the torque assist generation module 776 receives a HOW Low command, a HOW Med command, and a HOW High command. The HOW Low command, HOW Med command, and HOW High command are each multiplied by respective gain modules 802, 804 and 806. In one embodiment, gain module 802 multiplies HOW Low command by a value of 0.1, gain module 804 multiplies HOW Med command by a value of 0.3, and gain module 806 multiplies HOW High command by a value of 0.6. The outputs of gain modules 802, 804 and 806 are sent to adder 808, where the outputs are summed, and the sum of the adder 808 is sent to a rate limiter 810 that limits a rate of increase or decrease. The output of the rate limiter 810 is sent to saturation block 812, where a value of 0 to 1 is computed based on the value output from the rate limiter 810. A lane centering command is multiplied with the value output by the saturation block 812 at the product block 814. The product produced by the product block 814 is sent to the saturation limiter 816 to limit a saturation value produced by the product block 814. The output of the saturation limiter is then sent to an adder 818, where the output of the saturation limiter 816 is summed with a vehicle steering motor torque command. The output of the adder 818 is subjected to a second saturation limiter 820, which outputs the Tassist command.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A control system for a power steering system, the system comprising:

a processor; and a memory that includes instructions that, when executed by the processor, cause the processor to:

generate an error signal based on a difference of an estimated output vector and an output vector;

calculate a feedback correction signal based on the error signal and an observer gain value, the feedback correction signal reducing the difference of the estimated output vector and the output vector by driving the error signal to approach zero;

determine an extended state vector estimate based on the feedback correction signal and a motor torque command; and apply a gain to the extended state vector estimate to generate an estimated driver torque signal, the estimated driver torque signal is applied in control of the power steering system, wherein the extended state vector approaches an actual state vector.

2. The system of claim 1, wherein the instructions further cause the processor to generate the estimated output vector based on the extended state vector estimate.

3. The system of claim 1, wherein the instructions further cause the processor to determine the extended state estimate based on an extended state-space equation.

4. The system of claim 3, wherein the state-space equation is based on a motor torque, a t-bar torque signal, a motor position signal, and a motor velocity signal.

5. The system of claim 1, wherein the output vector includes a motor torque, a handwheel position signal, a motor position signal, and a motor velocity signal.

6. The system of claim 5, wherein the motor torque, the handwheel position signal, the motor position signal, and the motor velocity signal are represented in handwheel coordinates.

7. The system of claim 1, wherein the observer gain value is a matrix determined by a Kalman filtering technique.

8. The system of claim 1, wherein the estimated driver torque signal assists a handwheel to a center position.

9. The system of claim 1, wherein the estimated driver torque signal is used to scale at least one of a lane-centering command and a lane assist command in a driver assistance system.

10. A method for controlling a power steering system, the method comprising:

receiving at least an output vector;

generating an error signal based on a difference of an estimated output vector and the output vector;

calculating a feedback correction signal based on the error signal and an observer gain value, the feedback correction signal reducing the difference of the estimated output vector and the output vector by driving the error signal to approach zero;

determining an extended state vector estimate based on the feedback correction signal and a motor torque command; and applying a gain to the extended state vector estimate to generate an estimated driver torque signal, the estimated driver torque signal assists in control of the power steering system, wherein the extended state vector approaches an actual state vector.

11. The method of claim 10, wherein the extended state vector estimate is determined based on a state-space equation.

12. The method of claim 11, wherein the state-space equation is based on a motor torque, a handwheel position signal, a motor position signal, and a motor velocity signal.

13. The method of claim 10, wherein the output vector includes a motor torque, a handwheel position signal, a motor position signal, and a motor velocity signal.

14. The method of claim 13, wherein the motor torque, the handwheel position signal, the motor position signal, and the motor velocity signal are represented by handwheel coordinates.

15. The method of claim 10, wherein the observer gain value is a matrix based at least in part on a Kalman filtering technique.

16. The method of claim 10, wherein the estimated driver torque signal is used to assist a handwheel to a center position.

17. The method of claim 10, wherein the estimated driver torque signal is used to scale at least one of a lane-centering command and a lane assist command in a driver assistance system.

* * * * *